(12) United States Patent
Torrent

(10) Patent No.: US 9,391,492 B2
(45) Date of Patent: Jul. 12, 2016

(54) FACILITY FOR TRANSFORMING HEAT ENERGY

(71) Applicant: LI-MITHRA ENGINEERING, Uxegney (FR)

(72) Inventor: Pierre Yves Torrent, Thaon les Vosges (FR)

(73) Assignee: LI-MITHRA ENGINEERING, Uxegney (FR)

( * ) Notice: Subject to any disclaimer, the term of this patent is extended or adjusted under 35 U.S.C. 154(b) by 0 days.

(21) Appl. No.: 14/403,917

(22) PCT Filed: May 28, 2013

(86) PCT No.: PCT/FR2013/051188
§ 371 (c)(1),
(2) Date: Nov. 25, 2014

(87) PCT Pub. No.: WO2013/178938
PCT Pub. Date: Dec. 5, 2013

(65) Prior Publication Data
US 2015/0188388 A1      Jul. 2, 2015

(30) Foreign Application Priority Data

May 29, 2012   (FR) ...................................... 12 54916

(51) Int. Cl.
*F24H 4/04*          (2006.01)
*H02K 7/18*          (2006.01)
(Continued)

(52) U.S. Cl.
CPC .............. *H02K 7/18* (2013.01); *F24D 17/0021* (2013.01); *F24D 17/02* (2013.01); *F24H 4/04* (2013.01);
(Continued)

(58) Field of Classification Search
CPC ....................................................... F24D 17/00
USPC ............................................................ 60/641.8
See application file for complete search history.

(56) References Cited

U.S. PATENT DOCUMENTS

| | | | | |
|---|---|---|---|---|
| 4,290,266 A | * | 9/1981 | Twite ........................ | F03G 7/04 165/45 |
| 4,508,101 A | * | 4/1985 | Carter .................... | C09K 5/063 126/400 |

(Continued)

FOREIGN PATENT DOCUMENTS

| | | | | |
|---|---|---|---|---|
| DE | 2803953 A1 | * | 8/1979 | ................ F01K 3/00 |
| DE | 10043533 A1 | | 3/2002 | |

(Continued)

OTHER PUBLICATIONS

DE 2803953 Computer Translation.*

*Primary Examiner* — Joseph Waks
(74) *Attorney, Agent, or Firm* — Andrew W. Chu; Craft Chu PLLC

(57) ABSTRACT

The facility for transforming heat energy includes an energy-storage device including an HT vat containing a heat-transfer fluid HT in pressurized gaseous phase, a PCM vat containing a phase-change material, as PCM material, the PCM vat and the HT vat being positioned relative to one another such as to enable a transfer of heat energy between the PCM material and the HT fluid. There is a first electric generator connected to the HT vat by a fluid forward channel and a fluid backward channel, the generator generating power from a kinetic energy of the pressurized gaseous fluid, and a heat pump, transferring heat energy from a cold source to the energy-storage device in order to heat the HT fluid contained in the HT vat and/or to provide energy to the PCM material.

20 Claims, 1 Drawing Sheet

(51) Int. Cl.
*F24D 17/00* (2006.01)
*F24D 17/02* (2006.01)
*F28D 20/02* (2006.01)
*F25B 27/00* (2006.01)
*F28D 20/00* (2006.01)

(52) U.S. Cl.
CPC .............. *F25B 27/002* (2013.01); *F28D 20/02* (2013.01); *F28D 20/021* (2013.01); *F28D 20/026* (2013.01); *F24D 2200/16* (2013.01); *F24H 2240/127* (2013.01); *F28D 2020/0082* (2013.01); *Y02B 10/20* (2013.01); *Y02B 30/52* (2013.01); *Y02E 60/145* (2013.01); *Y02P 80/24* (2015.11)

(56) References Cited

U.S. PATENT DOCUMENTS

| | | | | |
|---|---|---|---|---|
| 4,696,338 | A | * | 9/1987 | Jensen .................. F28D 20/025 165/10 |
| 2008/0022683 | A1 | * | 1/2008 | Ohler ........................ F02C 6/14 60/641.8 |
| 2010/0230075 | A1 | * | 9/2010 | Mathur .................. F28D 20/021 165/104.21 |
| 2011/0100611 | A1 | * | 5/2011 | Ohler ........................ F01K 3/00 165/104.28 |
| 2012/0125019 | A1 | * | 5/2012 | Sami ...................... F24F 5/0046 62/79 |
| 2013/0247558 | A1 | * | 9/2013 | Maruya .................. B01D 3/007 60/597 |
| 2014/0318731 | A1 | * | 10/2014 | Mucciardi ............... F28D 20/02 165/10 |
| 2014/0327338 | A1 | * | 11/2014 | Vamvas ................... H02N 11/002 310/306 |
| 2015/0292770 | A1 | * | 10/2015 | Tandler ..................... F24J 2/05 126/618 |

FOREIGN PATENT DOCUMENTS

| | | | | |
|---|---|---|---|---|
| DE | 102006057846 | A1 | 6/2007 | |
| DE | 202008017601 | U1 | 4/2010 | |
| EP | 1067342 | A2 | 1/2001 | |
| FR | 2963646 | A1 | 2/2012 | |
| GB | 2455773 | A | 6/2009 | |
| GB | 2510375 | A * | 8/2014 | ......... F28D 20/0039 |
| WO | 2010128222 | A2 | 11/2010 | |

* cited by examiner

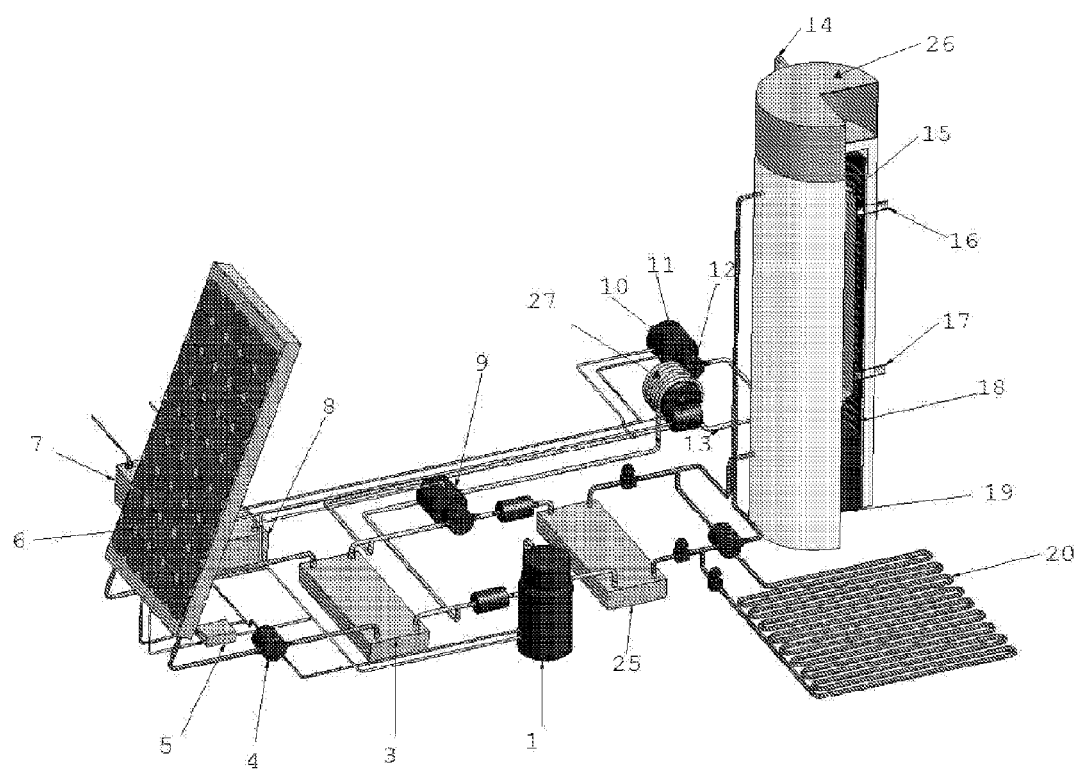

FACILITY FOR TRANSFORMING HEAT ENERGY

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention provides a facility for transforming, namely into electrical energy, heat energy collected by a heat pump. The invention is particularly interesting when the source of heat energy is highly fluctuating in time, for example, when the source of heat energy is a solar thermal panel.

2. Description of Related Art Including Information Disclosed Under 37 CFR 1.97 and 37 CFR 1.98

A facility for the collection of solar heat energy comprising a heat pump is described namely in FR No. 11/59075. Coupling a heat pump to a solar thermal panel permits to increase substantially the efficiency of the solar thermal panel. However, one of the disadvantages of a solar thermal panel remains, namely the irregularity of the source of heat energy, depending on the hour of the day, the seasons, the orientation of the panel, etc.

SUMMARY OF THE INVENTION

The invention provides a new facility for a regular production of electrical energy from a source of heat energy.

More specifically, the invention provides a facility for transforming heat energy, comprising:
an energy storage device, comprising:
a heat-transfer fluid vessel, referred to as HT vessel, containing a heat-transfer fluid, referred to as HT fluid, in a pressurized gas phase,
a PCM vessel containing a phase-change material, referred to as PCM material, the PCM vessel and the HT vessel being positioned relative to each other such as to permit a heat-energy transfer between the PCM material and the HT fluid
a first electric generator connected to the HT vessel by means of a fluid forward channel and a fluid backward channel, the generator being adapted for producing electrical energy from kinetic energy of the pressurized gaseous fluid,
a heat pump adapted for transferring heat energy from a cold source to the energy storage device, in order to heat the HT fluid contained in the HT vessel and/or to provide energy to the PCM material.
The electrical energy produced by the generator is:
supplied to a compressor of the heat pump, and/or
stored in an electric accumulator.
The first electric generator is for example a turbo-generator comprising a turbine and an alternator associated in series: it generates electric energy from the kinetic energy released by the expansion of the heat-transfer fluid in the pressurized gas phase. Then the fluid returns in liquid form to the HT vessel. The heat pump extracts heat energy from the cold source and transfers it to the energy storage device in order to heat and vaporize the HT fluid. The HT vessel thus stores the heat energy supplied by the fluid source, and absorbs the fluctuations in energy from the cold source. The first electric generator, in turn, supplies an electric energy controlled by controlling the flow and/or the pressure of the gaseous fluid at the outlet of the HT vessel. The HT fluid supplied to the first electric generator is preferably a HT fluid the vaporization temperature of which is about 10 to 70° C., which temperature is easily obtained from a heat pump. In one example, the HT fluid is ethanol, which fluid is common, inexpensive and easy to be handled.

In the facility according to the invention, the energy storage device can also comprise a first heat-exchanger element, for example a coil, positioned in or around the PCM vessel and an inlet and an outlet of which are respectively connected to an outlet and an inlet of a secondary element of the heat pump.

The energy storage in the HT vessel is limited by the fact that the storing of a gaseous fluid requires a large-volume vessel or a high pressure. The use in addition of a PCM vessel permits to store much more energy, especially when a PCM material of the solid/liquid type is used, because the phase change requires little or no additional volume, and no pressure is required. Tests have shown that the use of a PCM vessel permits the production of electrical energy for several days, even when the heat energy of the cold source is very low. Preferably, the PCM material has a melting temperature between 50 and 70° C.: such a temperature is easily accessible from a heat pump, it is sufficient to heat the HT fluid or domestic water and it is not necessary to use equipment resistant to high thermal stresses. In one example, the PCM material is sodium acetate trihydrate ($CH_3COONa$).

In the facility according to the invention, the energy storage device can also include a domestic hot water vessel, referred to as DHW vessel, the PCM vessel and the DHW vessel being positioned relative to each other such as to permit a heat-energy transfer between the PCM material and the water contained in the DHW vessel. In addition to electrical energy, the facility according to the invention also produces domestic hot water, which is available of course for consumption, but which is also used indirectly for the storage of heat energy.

In the energy storage device:
the HT vessel is positioned inside PCM the vessel, the PCM material filling the space between the PCM vessel and the HT vessel, such that the PCM material is into contact with a wall of the HT vessel, or
the wall of the fluid vessel is positioned into contact with a wall of the PCM vessel.
This permits an optimum heat-energy transfer between the PCM vessel and the HT vessel. Similarly, and for the same reasons:
the DHW vessel is positioned inside the PCM vessel; the first heat-exchanger element, such as a coil, is wound in the space between the PCM vessel and the DHW vessel; and the PCM material fills the space between the PCM vessel and the DHW vessel, or
the HT vessel is positioned above the PCM vessel, the wall of the HT vessel and the wall of the PCM vessel being into contact.

In a preferred embodiment, the HT vessel and the PCM vessel are enclosed in an insulated box. The whole can thus easily be moved and installed at a suitable location inside or near a building, even by a person, who is not specialized in this type of facility.

Preferably, the facility according to the invention also comprises a second heat-exchanger element positioned proximate the fluid backward channel from the electric generator to the HT vessel and connected to an inlet of the heat pump, for transferring a residual energy of the fluid exiting the generator to the inlet of the heat pump. Thus, the heat energy available within the system is used at best.

In a known way, the heat pump used in the facility according to the invention comprises, in series along a closed refrigerant circuit:
- an evaporator adapted for vaporizing the refrigerant from an energy taken from the cold source,
- a compressor adapted for compressing the gaseous refrigerant,
- a condenser adapted for liquefying the gaseous refrigerant in order to supply an energy to the energy storage device,
- a pressure-reducing device for lowering a pressure of the liquefied refrigerant.

According to one implementation, the pressure-reducing device is a second electrical generator adapted for transforming into electrical energy the mechanical energy released by lowering the pressure of the liquefied refrigerant. Thus, the heat energy usually lost in the pressure-reducing device is recovered and reused for generating electric power, which is then supplied to the compressor and/or stored in an electric accumulator.

In addition, a thermal heating circuit, including for example a floor heating or any other suitable device for diffusing heat can be connected to the secondary element at the outlet of the heat pump, in parallel with the energy storage device.

The facility according to the invention is namely interesting when it is connected to a cold source such as a solar thermal panel, particularly fluctuating over time. Tests have shown that, when properly sized and regulated, such a facility could easily supply, and make autonomous, with electricity, hot water and heating a residential building (private house or small apartment building) or a professional building with a surface of up to about 10,000 m2.

BRIEF DESCRIPTION OF THE DRAWINGS

The invention will be better understood, and further features and advantages of the invention will become clear from the following description of an exemplary embodiment of a facility according to the invention. This example is given by way of a non-restrictive example. The description should be read with reference to the accompanying drawing, in which the single FIGURE is a schematic view of an operating diagram of a facility according to the invention, in its most optimized version.

DETAILED DESCRIPTION OF THE DRAWINGS

The essential elements of the facility according to the invention are:
- an energy storage device comprising a heat-transfer fluid vessel 26, referred to as HT vessel, containing a HT fluid (tests carried out with ethanol) in a pressurized gas phase,
- a first electric generator 11 connected to the HT vessel by a fluid forward channel 14 and a fluid backward channel 13,
- a heat pump adapted for transferring heat energy from a cold source to the energy storage device in order to heat the HT fluid contained in the HT vessel.

The electric generator 11 is of the turbo-generator type comprising in a known way a turbine and an alternator connected in series in order to produce an electrical energy from kinetic energy of the pressurized gaseous fluid. At the outlet of the generator 11, the expanded fluid is cooled and condensed in a condenser 10, then returned in liquid form to the HT vessel through the fluid backward channel 13 by a pump 12.

The inlet of the heat pump is connected to the outlet of a solar thermal panel 6 by a closed primary circuit containing a suitable heat-transfer fluid. A load regulator 5 controls a circulation pump 4 in order to optimize the flow of fluid in the primary circuit and to thus optimize the performance of the solar panel and the complete facility.

Also in a known manner, the heat pump comprises, in series along a closed refrigerant circuit:
- an evaporator 3 adapted for vaporizing the refrigerant from an energy taken from the cold source, the evaporator forming a primary element of the heat pump,
- a compressor 1 adapted for compressing the gaseous refrigerant,
- a condenser 25 adapted for liquefying the gaseous refrigerant in order to supply an energy to the energy storage device, the condenser forming a secondary element of the heat pump,
- a pressure-reducing device 9 for lowering a pressure of the liquefied refrigerant.

Within the framework of the facility shown, the pressure-reducing device is a second electric generator, of the turbo-generator type, adapted for transforming into electrical energy the mechanical energy released by lowering the pressure of the liquefied refrigerant. Also, the evaporator 3 and the condenser 25 are preferably chosen of the fin exchanger type, for their ease of installation.

The electrical energy produced by the first and/or the second generator, depending on the amount of available electrical energy, is supplied to the compressor 1 of the heat pump, and/or stored in an electric accumulator 8. Preferably, the energy is stored in the accumulator 8 at high voltage, for example 400V, and at the outlet of the accumulator 8 an inverter 7 adapts the voltage depending on the downstream electric charge.

In the example shown, in addition to the HT vessel, the energy storage device also comprises:
- a PCM vessel 19 containing a phase change material, referred to as PCM material, the HT vessel is positioned above the PCM vessel and the contact between the two vessels permits a heat-energy transfer between the PCM material and the HT fluid,
- a domestic hot water vessel 15, referred to as DHW vessel, the DHW vessel is positioned within the PCM vessel, in order to permit a heat-energy transfer between the PCM material and the water contained in the DHW vessel,
- a coil 18 wound in the space between the PCM vessel and the DHW vessel.

The coil 18 is connected to the secondary element of the heat pump, in parallel to the HT vessel, for receiving energy from the heat pump, which energy will be transferred to the PCM material.

The HT vessel and the PCM vessel are enclosed together in an insulated box (not shown for clarity reasons), and the PCM material fills the space between the PCM vessel and the DHW vessel 15. In the implemented facility, the PCM material used is sodium acetate trihydrate ($CH_3COONa$).

The PCM material accumulates the heat energy it receives from the heat pump while it is liquefying. Then, the PCM material restitutes this heat partly to the HT fluid and partly to the domestic hot water while it solidifies.

The facility also comprises a second coil 27 positioned adjacent to the fluid backward channel 13 from the electric generator to the HT vessel, more specifically about a device 12 for recovering the condensed HT fluid at the outlet of the turbo-generator 11. The coil is connected to an inlet of the heat pump, more specifically in parallel on the evaporator 3, between the outlet of the pressure-reducing device 9 and the inlet of the compressor 1, for transferring a residual energy of the fluid exiting from the generator to the inlet of the heat pump.

In the example also shown, an energy-dissipation device 20 of the floor-heating type is also connected to the secondary element of the heat pump, in parallel with the energy storage device. It permits to heat the room air in a building.

The HT vessel, the MPC vessel and the energy-dissipation device are all connected to the secondary element of the heat pump, in parallel to each other by a suitable piping network integrating variable flow-rate valves permitting to vary the flow-rate a heat-transfer fluid in the whole or part of the network.

The valves are preferably remotely controllable, and a control means is provided for controlling the opening or closing of each valve independently from each other, such as to optimize continuously the performance of the entire system by supplying the HT vessel, the PCM vessel and/or the energy-dissipation device with energy, namely depending, at a given time, on:
- the energy available in the cold source,
- the energy required for operating the energy-dissipation device, for example, when the dissipation device is a floor heating in a home, the control of the flow-rate of the valves is optimized depending on a temperature measured inside the home with respect to a desired temperature,
- a desired temperature in the DHW vessel,
- the pressure measured in the HT vessel, with respect to a desired pressure,
- the amount of energy available in the PCM vessel compared to its maximum storage capacity,
- priorities given to a consumer of energy (HT vessel, DHW vessel, dissipation device, etc.) over the others, depending on the day, time, weather, etc.

I claim:

1. A facility for transforming heat energy, comprising:
an energy storage device, comprising:
  a heat-transfer fluid vessel, referred to as HT vessel, containing a heat transfer fluid, referred to as an HT fluid, in a pressurized gas phase and having a fluid vessel wall,
  a PCM vessel containing a phase-change material, referred to as PCM material and having a material wall, the PCM vessel and the HT vessel being positioned relative to each other such as to permit a heat-energy transfer between the PCM material and the HT fluid, wherein said fluid vessel wall contacts said material wall, said heat-energy transfer being direct;
a first electric generator connected to the HT vessel by a fluid forward channel and a fluid backward channel, the generator producing electrical energy from a kinetic energy of the pressurized gaseous fluid; and
a heat pump transferring heat energy from a cold source to an energy storage device, in order to heat the HT fluid contained in the HT vessel, to provide energy to the PCM material or both.

2. The facility according to claim 1, wherein the energy storage device also comprises a first heat-exchange element, being comprised of a coil being positioned in or around the PCM vessel, and having an inlet and an outlet connected respectively to an outlet and an inlet of a secondary element of the heat pump, in order to receive heat energy from the heat pump.

3. The facility according to claim 2, wherein the energy storage device also comprises a domestic hot water vessel, referred to as DHW vessel, the PCM vessel and the DHW vessel being positioned with respect to each other such as to permit a heat-energy transfer between the PCM material and the water contained in the DHW vessel.

4. The facility according to claim 3,
  wherein the DHW vessel is positioned inside the PCM vessel;
  wherein the first heat-exchanger element is wound in space between the PCM vessel and the DHW vessel;
  wherein the PCM material fills the space between the PCM vessel and the DHW vessel;
  wherein the HT vessel is positioned above the PCM vessel, a wall of the HT vessel and a wall of the PCM vessel being into contact, and
  wherein the HT vessel and the PCM vessel are enclosed together in an insulated box.

5. The facility according to claim 2, wherein, in the energy storage device, the HT vessel is positioned inside the PCM vessel, the PCM material filling space between the PCM vessel and the HT vessel, and wherein a wall of the HT vessel in contact with at least one of a group consisting of the PCM material and a wall of the PCM vessel.

6. The facility according to claim 2, comprising also a second exchanger element positioned adjacent to the fluid backward channel from the electric generator to the HT vessel and connected to an inlet of the heat pump, transferring a residual energy of the fluid exiting the electric generator to the inlet of the heat pump.

7. The facility according to claim 2, wherein the PCM material has a melting temperature between 50 and 70° C.

8. The facility according to claim 1, wherein the electrical energy generated by the electric generator supplies to one of a group consisting of: a compressor of the heat pump, an electric accumulator for storage, or both the compressor and the electric accumulator.

9. The facility according to claim 1, wherein the heat pump comprises, in series along a closed refrigerant circuit:
  an evaporator vaporizing refrigerant from energy taken from a cold source, the evaporator forming a primary element of the heat pump,
  a compressor compressing the refrigerant, the refrigerant being gaseous,
  a condenser liquefying the gaseous refrigerant in order to supply an energy to the energy storage device, the condenser forming a secondary element of the heat pump, and
  a pressure-reducing device lowering a pressure of the liquefied refrigerant, wherein the pressure-reducing device is a second electric generator transforming mechanical energy released into electrical energy by lowering pressure of the liquefied refrigerant.

10. The facility according to claim 9, wherein the electrical energy produced by the pressure-reducing device is supplied to at least one of a group consisting of: the compressor and an electric accumulator for storage.

11. The facility according to claim 1, wherein the fluid supplied to the first electric generator is ethanol.

12. The facility according to claim 11, wherein the PCM material is sodium acetate trihydrate ($CH_3COONa$).

13. The facility according to claim 1, wherein a primary element of the heat pump is connected to a solar thermal panel.

14. A facility for transforming heat energy, comprising:
an energy storage device, comprising:
- a heat-transfer fluid vessel, referred to as HT vessel, containing a heat transfer fluid, referred to as an HT fluid, in a pressurized gas phase,
- a PCM vessel containing a phase-change material, referred to as PCM material, the PCM vessel and the HT vessel being positioned relative to each other such as to permit a heat-energy transfer between the PCM material and the HT fluid;

a first electric generator connected to the HT vessel by a fluid forward channel and a fluid backward channel, the generator producing electrical energy from a kinetic energy of the pressurized gaseous fluid; and a heat pump transferring heat energy from a cold source to an energy storage device, in order to heat the HT fluid contained in the HT vessel, to provide energy to the PCM material or both, wherein the energy storage device also comprises a first heat-exchange element, being comprised of a coil being positioned in or around the PCM vessel, and having an inlet and an outlet connected respectively to an outlet and an inlet of a secondary element of the heat pump, in order to receive heat energy from the heat pump, wherein the energy storage device also comprises a domestic hot water vessel, referred to as DHW vessel, the PCM vessel and the DHW vessel being positioned with respect to each other such as to permit a heat-energy transfer between the PCM material and the water contained in the DHW vessel, wherein the DHW vessel is positioned inside the PCM vessel, wherein the first heat-exchanger element is wound in space between the PCM vessel and the DHW vessel, wherein the PCM material fills the space between the PCM vessel and the DHW vessel, wherein the HT vessel is positioned above the PCM vessel, a wall of the HT vessel and a wall of the PCM vessel being into contact, and wherein the HT vessel and the PCM vessel are enclosed together in an insulated box.

15. The facility according to claim 14, further comprising a second exchanger element positioned adjacent to the fluid backward channel from the electric generator to the HT vessel and connected to an inlet of the heat pump, transferring a residual energy of the fluid exiting the electric generator to the inlet of the heat pump.

16. The facility according to claim 14, wherein the electrical energy generated by the electric generator supplies to one of a group consisting of: a compressor of the heat pump, an electric accumulator for storage, or both the compressor and the electric accumulator.

17. The facility according to claim 14, wherein the heat pump comprises, in series along a closed refrigerant circuit:

an evaporator vaporizing refrigerant from energy taken from a cold source, the evaporator forming a primary element of the heat pump, a compressor compressing the refrigerant, the refrigerant being gaseous, a condenser liquefying the gaseous refrigerant in order to supply an energy to the energy storage device, the condenser forming a secondary element of the heat pump, and a pressure-reducing device lowering a pressure of the liquefied refrigerant, wherein the pressure-reducing device is a second electric generator transforming mechanical energy released into electrical energy by lowering pressure of the liquefied refrigerant.

18. A facility for transforming heat energy, comprising:
an energy storage device, comprising:
- a heat-transfer fluid vessel, referred to as HT vessel, containing a heat transfer fluid, referred to as an HT fluid, in a pressurized gas phase,
- a PCM vessel containing a phase-change material, referred to as PCM material, the PCM vessel and the HT vessel being positioned relative to each other such as to permit a heat-energy transfer between the PCM material and the HT fluid;

a first electric generator connected to the HT vessel by a fluid forward channel and a fluid backward channel, the generator producing electrical energy from a kinetic energy of the pressurized gaseous fluid; and a heat pump transferring heat energy from a cold source to an energy storage device, in order to heat the HT fluid contained in the HT vessel, to provide energy to the PCM material or both, wherein the energy storage device also comprises a first heat-exchange element, being comprised of a coil being positioned in or around the PCM vessel, and having an inlet and an outlet connected respectively to an outlet and an inlet of a secondary element of the heat pump, in order to receive heat energy from the heat pump, and wherein, in the energy storage device, the HT vessel is positioned inside the PCM vessel, the PCM material filling space between the PCM vessel and the HT vessel, and wherein a wall of the HT vessel in contact with at least one of a group consisting of the PCM material and a wall of the PCM vessel.

19. The facility according to claim 18, further comprising a second exchanger element positioned adjacent to the fluid backward channel from the electric generator to the HT vessel and connected to an inlet of the heat pump, transferring a residual energy of the fluid exiting the electric generator to the inlet of the heat pump.

20. The facility according to claim 18, wherein the electrical energy generated by the electric generator supplies to one of a group consisting of: a compressor of the heat pump, an electric accumulator for storage, or both the compressor and the electric accumulator.

* * * * *